(12) United States Patent
Aharon

(10) Patent No.: US 6,388,743 B1
(45) Date of Patent: May 14, 2002

(54) VIDEO LASER BEAM ANALYZER

(75) Inventor: Oren Aharon, Haifa (IL)

(73) Assignee: Duma Optronics, Ltd., Nesher (IL)

( * ) Notice: Subject to any disclaimer, the term of this patent is extended or adjusted under 35 U.S.C. 154(b) by 0 days.

(21) Appl. No.: 09/619,719

(22) Filed: Jul. 19, 2000

(30) Foreign Application Priority Data

Jul. 20, 1999 (IL) .............................................. 130995

(51) Int. Cl.$^7$ ................................................. G01J 1/02
(52) U.S. Cl. ..................................................... 356/121
(58) Field of Search ................................ 356/121, 122, 356/123, 218, 225

(56) References Cited

U.S. PATENT DOCUMENTS 5,587,786 A * 12/1996 Champagne et al. ........ 356/121
5,592,285 A * 1/1997 Pund .......................... 356/121
5,909,274 A * 6/1999 Stucchi ....................... 356/121
5,914,777 A * 6/1999 Imura ......................... 356/121

* cited by examiner

Primary Examiner—Hoa Q. Pham
(74) Attorney, Agent, or Firm—Browdy and Neimark, P.L.L.C.

(57) ABSTRACT

A light or laser beam analyzer, using an imaging formation device such as a CCD video camera is equipped with an attenuating controllable filter or electronic shutter. The incoming beam is imaged several consecutive images each with a different attenuation and the spatial power level distribution on the detector's surface is digitized and transmitted to a host computer for further processing. The host computer will present the power distribution and calculate the beam's profile and the beam's shape.

8 Claims, 6 Drawing Sheets

VIDEO LASER BEAM ANALYZER

FIELD OF THE INVENTION

The present invention relates to the field of optical testing of laser beams. More specifically, it concerns testing of laser beam profilers and analyzing power distribution in a perpendicular direction to the laser propagation axis.

BACKGROUND OF THE INVENTION

Designing, building, and/or using laser systems requires instrumentation for measuring the laser beam characteristics.

It is particularly useful to measure the beam intensity profile across the transverse area of the beam at any selected position. The beam intensity distribution across the transverse plane is a two-dimensional mapping of the beam intensity across and perpendicular to the beam length.

Much effort has been dedicated towards the measuring and standardization of beam profilers and their distribution. Two main technologies are available: those which use spatial cameras as the beam characterization system, and systems using moving mechanical slits or knife edges to scan across the incoming beam.

Both technologies are well described at the 1998/1999 Coherent Catalog for Laser and Photonic Applications (Coherent Auburn Group, USA).

The main advantages of mechanical scanning devices over a camera type system is their large dynamic range, enabling accurate measurements of beams with both high and low intensities.

On the other hand, camera type systems are excellent for fast and detailed analyses of laser beam intensity profiles, but are limited in their accuracy due to a relatively low dynamic range.

SUMMARY OF THE INVENTION

It is an object of the present invention to overcome the limited dynamic range of a camera type beam profiler and accurately measure faint structures of light beams including laser beams and coherent beams, by sampling the beam plural times (at least twice), each sampling being performed at a different attenuation or electronic shutter.

It is another object of the present invention to overcome difficulties of the prior art, such as indicated above, and more especially the lack of dynamic range in a camera based system to allow examination of faint features at the base of the laser beam profile.

It is a further object of the present invention to provide improvements in the testing of laser systems as well as in testing other light sources.

In accordance with the present invention, a video camera apparatus is provided, which is suitable for measuring beam power spatial distribution at an increased dynamic range revealing and measuring faint spatial power features. The laser, or the light beam to be analyzed, is imaged through a filter or an electronic shutter by a Charged Coupled Device (CCD) or other video camera and the amount of energy on each of the video camera pixels is recorded to obtain an original or reference image, and then digitized and transferred to a host computer for further processing.

The electronic shutter or optical filter, is tuned in such a way that none of the imaging pixels is saturated (i.e. saturation is defined as the stage where additional laser power on the same pixel will not generate additional proportional electronic signal).

The electronic shutter or optical filter is then removed, or the attenuation is significantly reduced, and the laser or the light beam is examined a second time by referably the same video camera to obtain a second image.

Due to the fact that the impinging power on the detection surface during the second examination is significantly higher, some of the image pixels will then be saturated. Some other pixels which at the original filter setting were below the digitization level will then be clearly displayed and analyzed.

The beam profiles are analyzed by using multiple images (a minimum of two), each one being attenuated by a different known factor which will be a part of the calculation to measure the beam intensity profile. The calculation, in percentages, will be generated with regards to the original non-saturated picture. Each faint pixel which originally was undetectable will be calculated by its energy value divided by the attenuation factor of the filter or electronic shutter.

BRIEF DESCRIPTION OF THE DRAWINGS

Other objects, as well as the nature and advantages of the present invention will become more apparent from the following detailed description of the preferred embodiments taken in conjunction with the drawing wherein.

DESCRIPTION OF THE PREFERRED EMBODIMENTS

Figure 1:
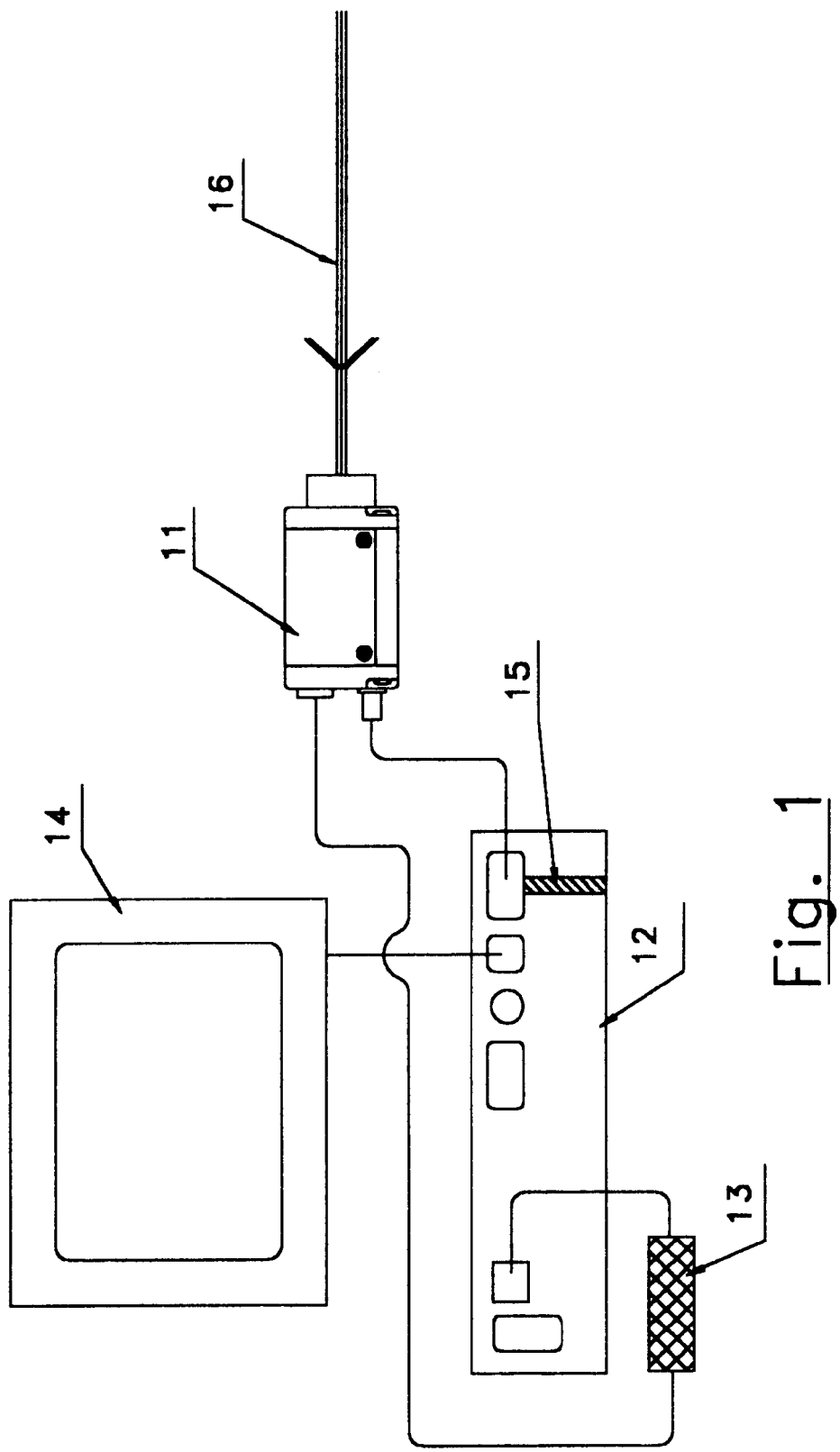
FIG. 1 is a schematic view of a first preferred embodiment.

In FIG. 1 an apparatus comprised of a video camera (11) (no lens attached), a built-in electronic shutter activated by a computer (12) via an electronic driver (13), a monitor (14) for viewing the results and a video capture board (15) plugged into said computer is used for examining the incoming laser or other light beam (16).

Figure 6:
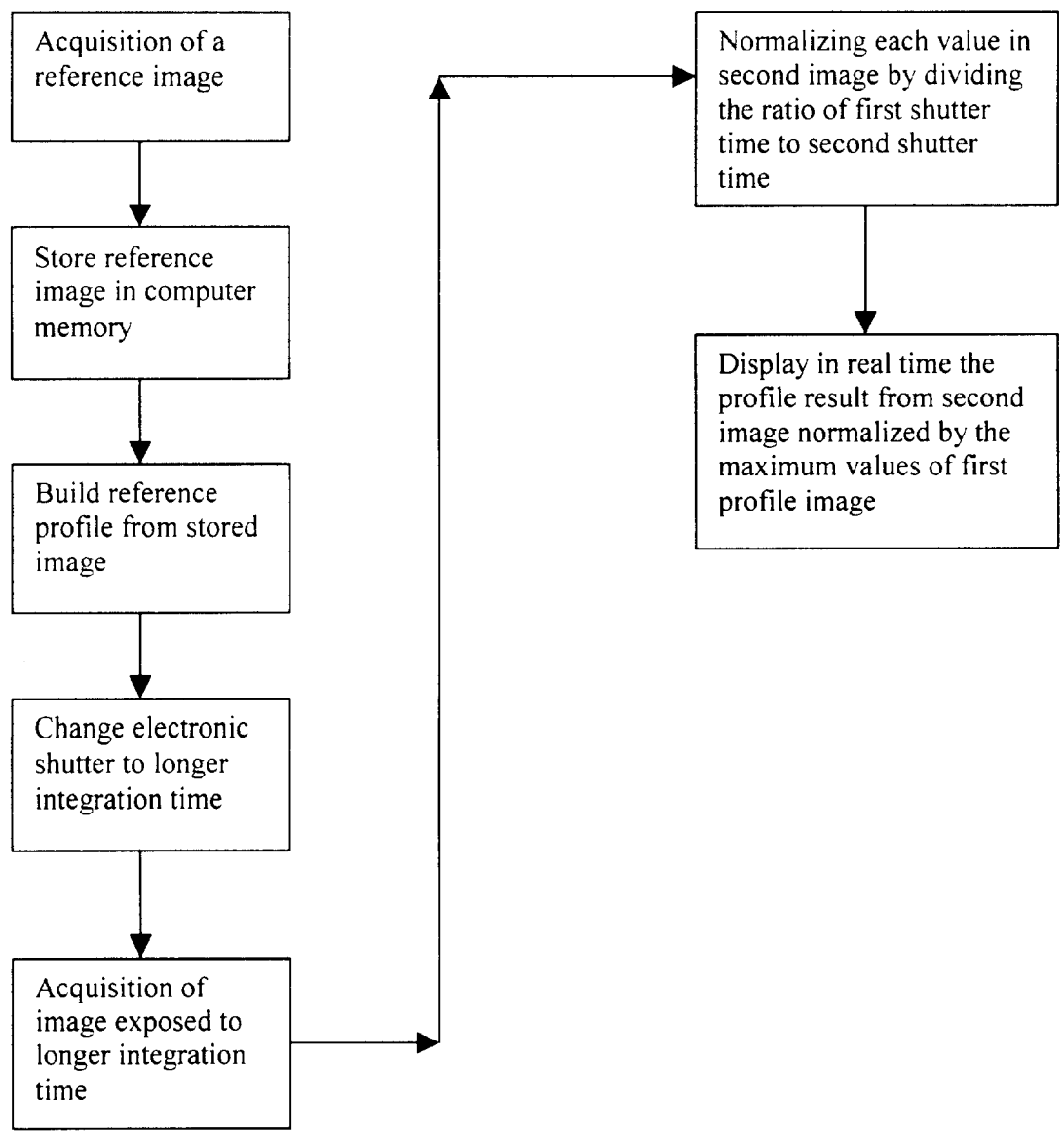
FIG. 6 is a software block diagram for software capable of controlling the present apparatus.

Suitable software (not shown), either known or routinely programmable, is provided in order to activate the electronic shutter and generate the required results from the combination of two (or more) images, one being exposed by the electronic shutter for a longer time than the first or reference image. FIG. 6 shows a block diagram for such software.

Figure 2:
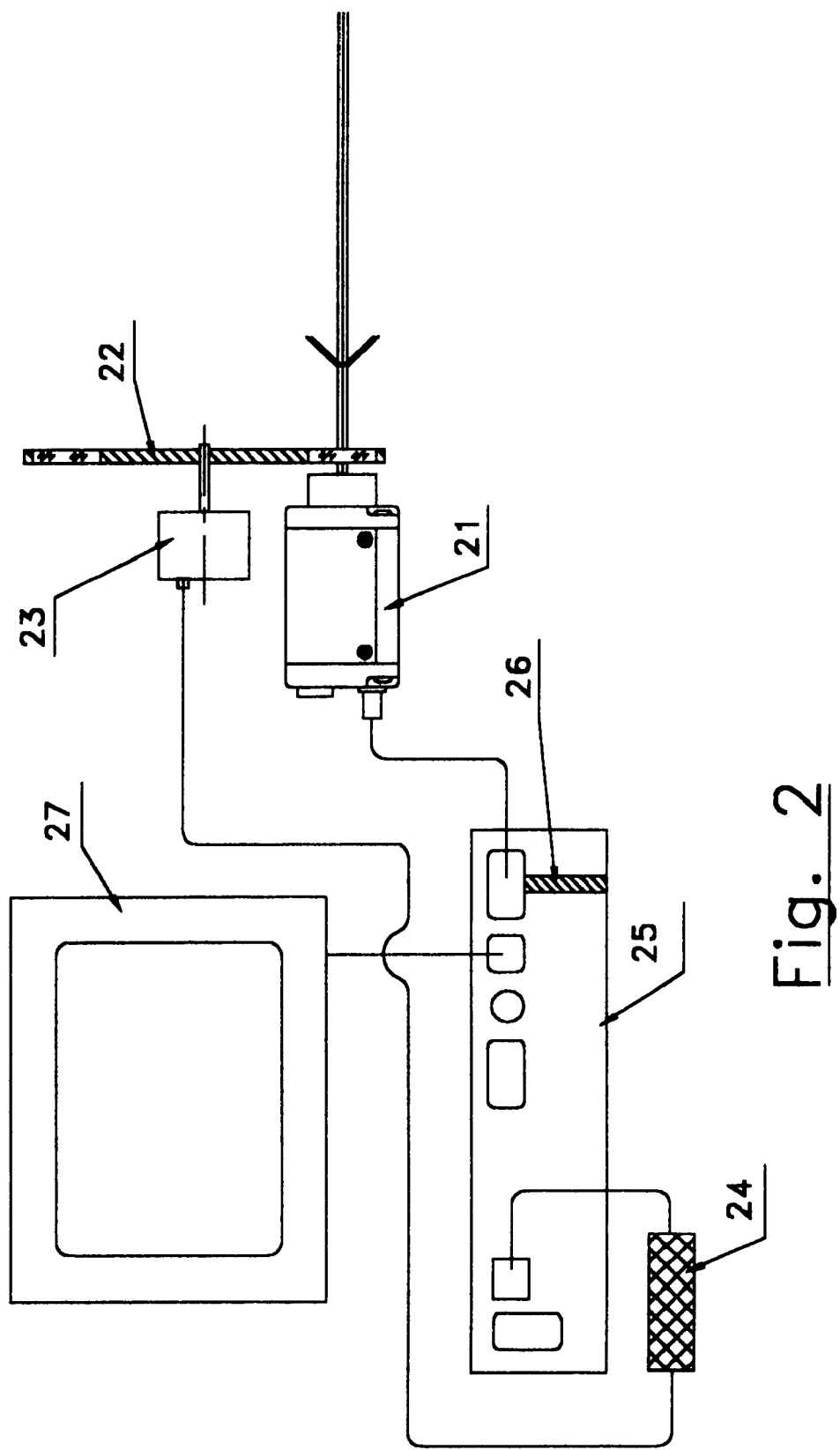
FIG. 2 is a schematic view of a second preferred embodiment.

In FIG. 2 a similar arrangement is shown, where the electronic shutter is replaced with a rotating filter wheel. Here the apparatus is comprised of an electronic video camera (21), with or without an electronic shutter, a rotating optical filter wheel (22), a rotating motor (23), a controller (24) connected to the computer and which activates the motor and filter wheel, a computer (25) for system control, a video capture board (26), a monitor or other display means (27), and controlling software for activating the apparatus (not shown). The software activates the filter wheel (22) to create two images of the examined laser beam, each at a different attenuation, and the system generates laser profiles which are a combination of the two or more captured images.

Figure 3:
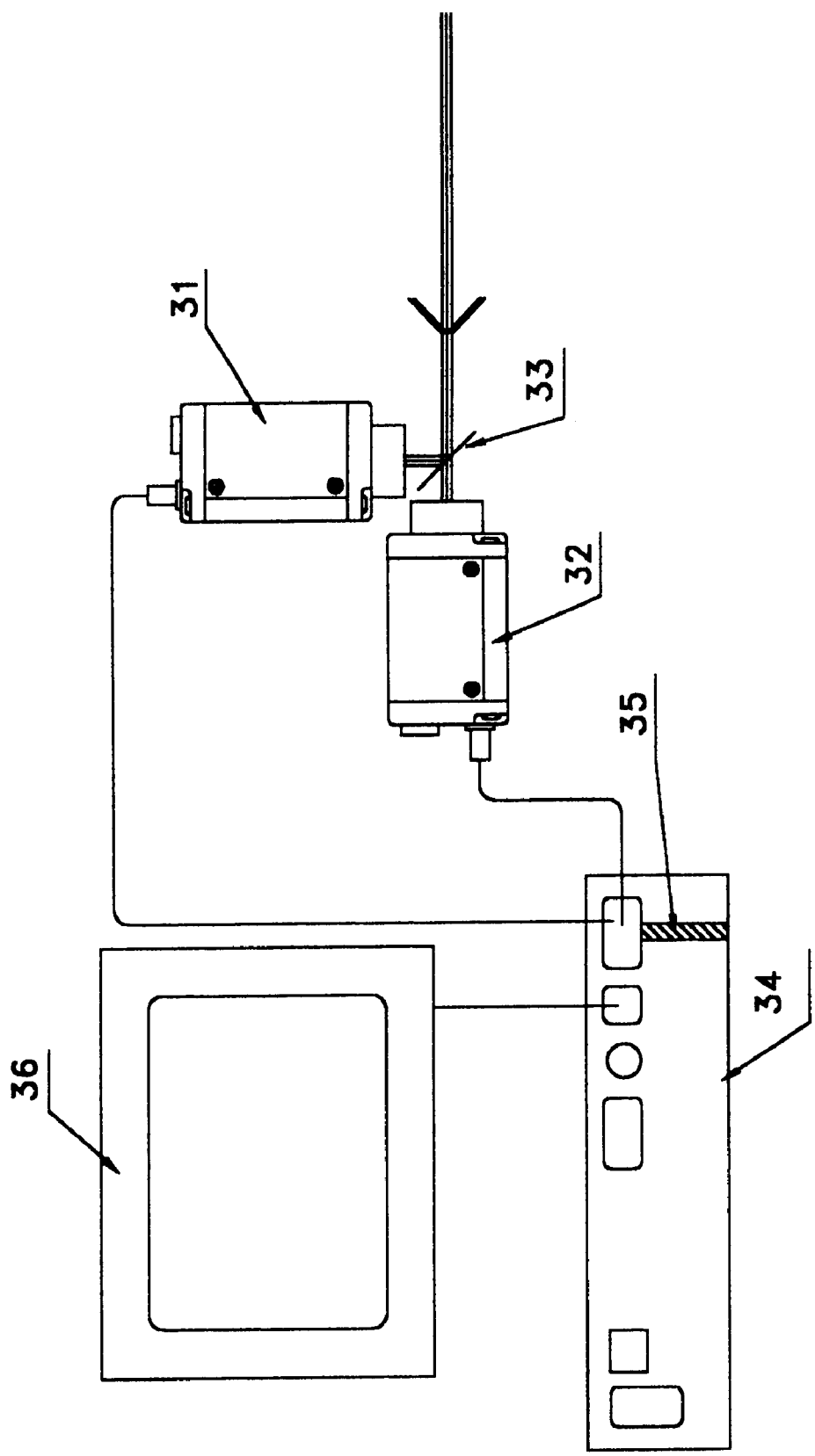
FIG. 3 is a schematic view of a third preferred embodiment.

In FIG. 3, a somewhat different embodiment is disclosed, where the beam is split into two parts unequally, so that one camera receives a significantly higher signal than the second camera. Here, the apparatus is comprised of two electronic video cameras (31) and (32), a beam splitting element (33), a computer for system control (34), a dual port video capture board (35), a monitor or other display means (36), and routine controlling software (not shown). The software and video capture means acquire the two images generated by both cameras, each having a significant power level, and generate different laser profiles based on both images similar to those produced by the embodiments of FIGS. 1 and 2.

Figure 4:
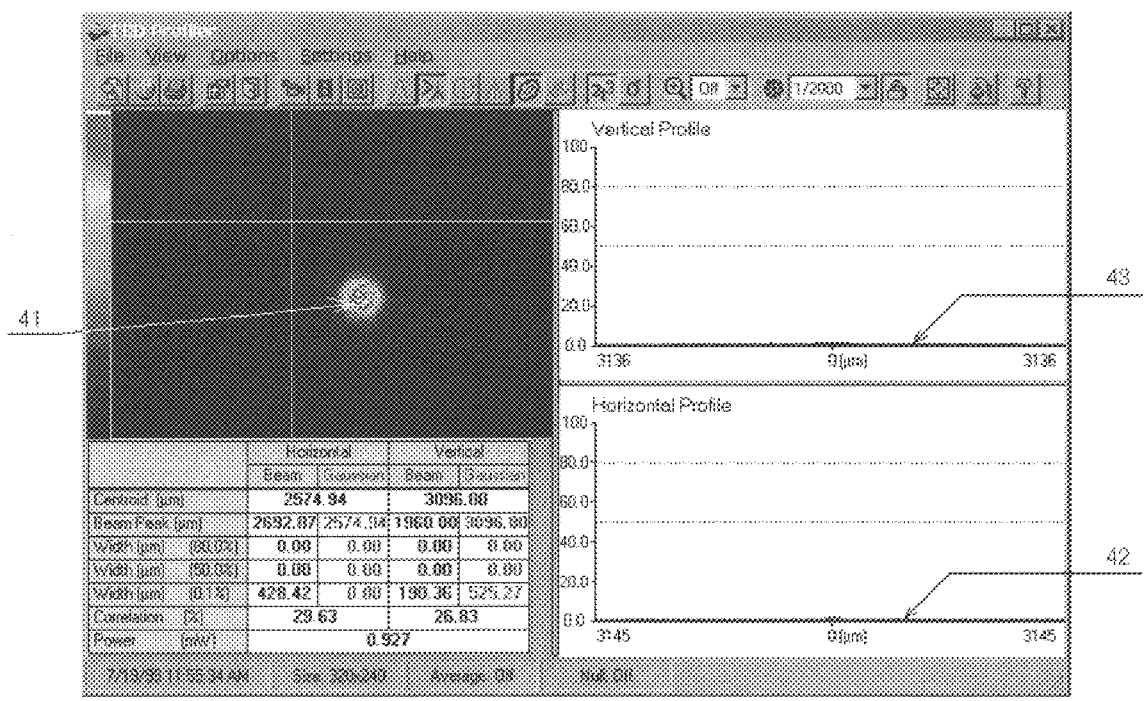
FIG. 4 is a computer-generated view of the results of a prior art system in a regular working mode without activation of multiple analyses of consecutive pictures, i.e. providing only a single image.

FIG. 4 there is a typical output from a software operating a CCD type profiler, where the beam analyzer operates in a regular mode. On the left-hand side of this figure, an image (41) is displayed, where no saturation occurs and thus no faint phenomena at the image basis is displayed in this picture. A horizontal profile (42) and a vertical profile (43) are displayed, showing the beam profile in a selected row and column. The dashed lines in the profiles presentation show the levels at which the beam is examined.

Figure 5:
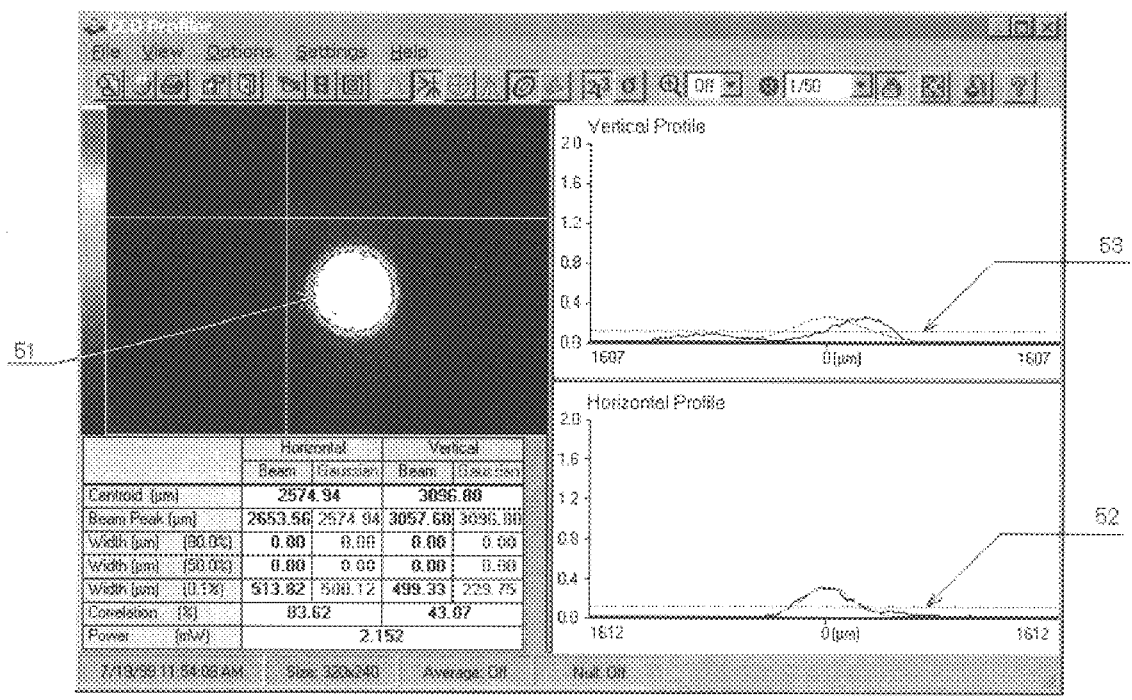
FIG. 5 is a computer-generated view of the results of the system in a mode where the multiple image analysis is applied according to the present invention.

In FIG. 5 there is a computer-generated image by combining plural images, where the same image (51) is sampled, but the integration time is greatly increased by selecting a different shutter. In this picture, faint phenomena are clearly seen at the basis, and the horizontal profile (52) and the vertical profile (53) provide information related to the original or reference image, thus enabling measuring of said faint image.

The software for the above three and other embodiments, see FIG. 6, controls processing of the apparatus, whereby dynamic range is increased.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. An apparatus for measuring beam parameters of a light beam, comprising:
    a camera for creating an electronic image of the examined beam;
    attenuating means for creating different attenuating levels of the examined beam;
    a computer for capturing two or more differently attenuated images of the examined beam;
    software for processing and increasing the dynamic range of said apparatus; and
    a processor coupled to said camera for determining the beam parameters from the different captured images and revealing faint phenomena usually at the basis of the beam profile.

2. The apparatus according to claim 1, where the attenuating means is built into the camera.

3. The apparatus of claim 2, wherein the attenuating means is an electronic shutter controlled by said processor means and software.

4. An apparatus according to claim 1, where the attenuating means is an optical filter with a variable controllable density.

5. An apparatus according to claim 1, further comprising a second camera and a beam splitter that constitutes said attenuating means, whereby two differently attenuated images are created by said beam splitter and captured parallel by said two cameras.

6. A method for measuring beam parameters of a light beam, comprising:
    providing a camera for creating at least one electronic image of the light beam to be examined;
    capturing at least two differently attenuated images of said light beam; and
    combining said at least two differently attenuated images to reveal faint phenomena not normally visible on the basis of only one image.

7. An apparatus for measuring intensity distribution of a beam across a plane transverse to the beam, comprising:
    at least one camera for creating an electronic image of the examined beam;
    attenuating means for creating different attenuating levels of the examined beam;
    a computer coupled to said at least one camera for capturing two or more differently attenuated images of the examined beam;
    software for processing and increasing the dynamic range of said apparatus; and
    a processor coupled to said camera for determining the beam intensity distribution from the different captured images and revealing faint phenomena usually at the basis of the beam profile, wherein
    the examined beam has a low intensity part and a high intensity part;
    the different attenuating levels include a low attenuation level and a high attenuation level; and
    said processor is operative for calculating the intensity of the low intensity part of the examined beam as a function of a relation between the low and high attenuation levels.

8. A method for measuring intensity distribution of a beam across a plane transverse to the beam, comprising:

providing a camera for creating at least one electronic image of the light beam to be examined;

capturing at least two differently attenuated images of said light beam; and combining said two or more differently attenuated images to reveal faint phenomena in the intensity distribution not normally visible on the basis of only one image, wherein the light beam to be examined has a low intensity part and a high intensity part;

a first one of the captured images is a highly attenuated image of the light beam to be examined and a second one of the captured images is an image that is less attenuated than the highly attenuated image; and said combining step comprises calculating the intensity of the low intensity part of the light beam as a function of a relation between the attenuation of the first one of the captured images and the attenuation of the second one of the captured images.

* * * * *